March 15, 1966  G. E. TOWNSEND  3,240,471
VEHICLE BUMPER JACK

Filed Sept. 20, 1963  2 Sheets-Sheet 1

INVENTOR.
GILBERT E. TOWNSEND
BY Cullen, Sloman & Cantor
ATTORNEYS

March 15, 1966 G. E. TOWNSEND 3,240,471
VEHICLE BUMPER JACK
Filed Sept. 20, 1963 2 Sheets-Sheet 2
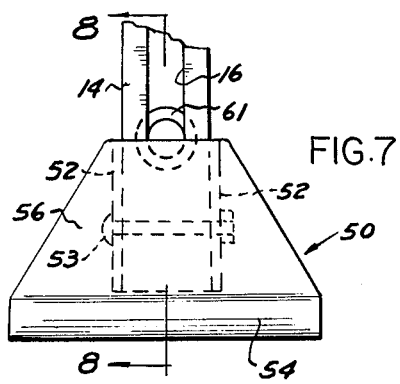
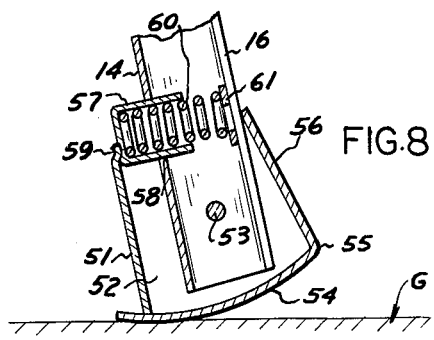
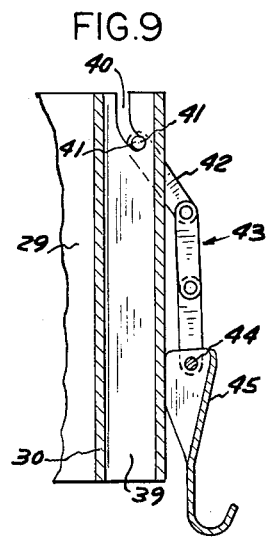
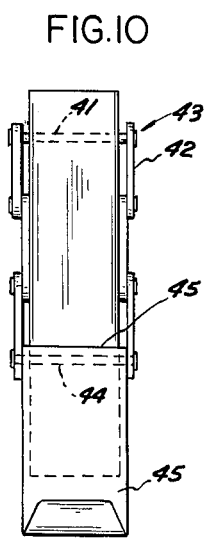
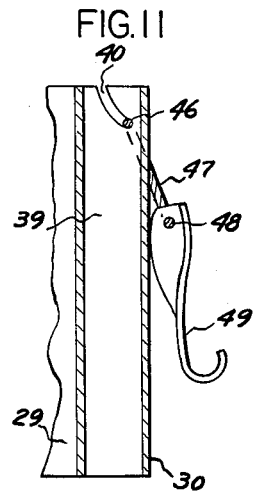
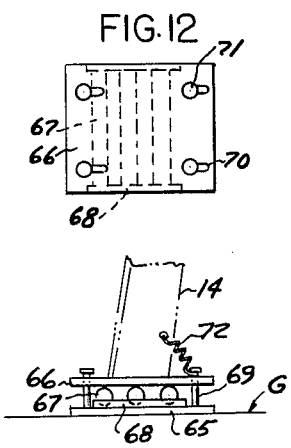
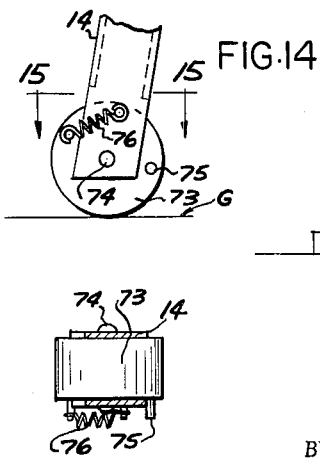
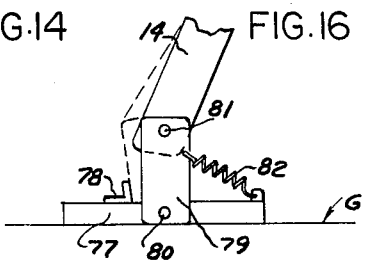
INVENTOR.
GILBERT E. TOWNSEND
BY Cullen, Sloman & Cantor
ATTORNEYS

United States Patent Office 3,240,471
Patented Mar. 15, 1966

3,240,471
VEHICLE BUMPER JACK
Gilbert E. Townsend, 37975 Lanse Creuse,
Mount Clemens, Mich.
Filed Sept. 20, 1963, Ser. No. 310,397
7 Claims. (Cl. 254—99)

The present invention relates to vehicle bumper jacks, and more particularly to a tri-pod or bi-pod jack construction.

Heretofore in jack constructions of this type, the load transmitted to the front channel caused it to dig into the ground, with the rear supporting leg or legs lifting off the ground.

It is an object of the present invention to provide a novel form of yieldable moving means flexibly and supportably connected to the front channel whereby upon application of a downward load instead of digging into the ground surface the front channel will roll forwardly with the rear legs moving horizontally along the ground surface remaining in contact therewith.

It is another object to provide an improved carrier adapted for reciprocal adjustments upon the front channel and with a flexible means mounting the vehicle engaging hook adjustably secured to the carrier.

It is another object to provide an improved mounting for the control screw and for suspending and journaling the same.

These and other objects will be seen from the following specification and claims in conjunction with the appended drawings in which:

FIG. 7 is a fragmentary front elevational view of the lower end of the front channel showing the mounting of its yieldable moving means.

FIG. 8 is a fragmentary section taken in the direction of arrows 8—8 of FIG. 7.

FIG. 9 is a fragmentary side elevational section showing a slightly different form of flexible connection between the vehicle engaging hook and the body connected to the vertically adjustable carrier.

FIG. 10 is a front elevational view thereof.

FIG. 11 is similar to FIG. 9 showing a different flexible mounting for the bumper engaging hook.

FIGS. 12 and 13 are respectively plan and fragmentary side elevational views of a different form of yieldable moving means supporting the front channel.

FIG. 14 is a fragmentary side elevational view of a different form of yieldable moving means supporting the front channel.

FIG. 15 is a fragmentary section taken in the direction of arrows 15—15 of FIG. 14.

FIG. 16 is a fragmentary side elevational view of still another form of yieldable moving means for the front channel.

It will be understood that the above drawings illustrate merely a preferred embodiment of the invention, and that other embodiments are contemplated within the scope of the claims hereafter set forth.

*Basic vehicle bumper jack*

Figure 1:
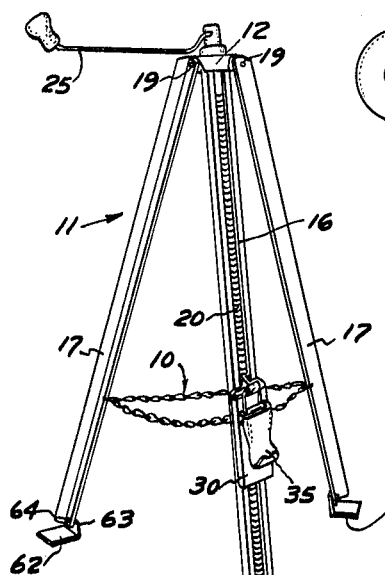
FIG. 1 is a front perspective view of the present vehicle bumper jack.
Figure 2:
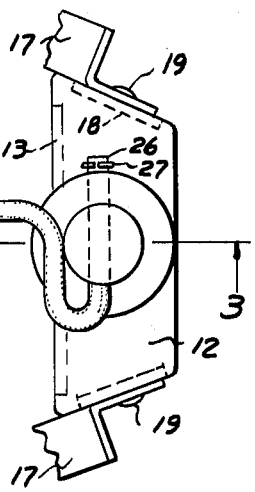
FIG. 2 is a fragmentary plan view thereof, on an increased scale.

The present bumper jack 11 may be a bi-pod or a tri-pod, as shown for illustration, FIG. 1, and includes top plate 12, FIG. 2, with depending rear flange 13. Plate 12 centrally overlies front channel 14 slotted at 16. flange 13 is fixed secured to said front channel at its upper end as at 15, FIG. 3.

Angularly related rear support legs 17 are pivotally connected at their upper ends at 19 to the opposed depending end flanges 18 of plate 12. Flexible chain 10 interconnects legs 17 with front channel 14, FIG. 1.

*Feed screw mounting*

Figure 3:
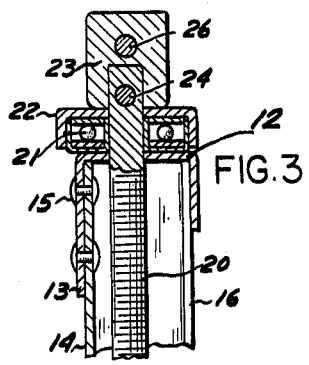
FIG. 3 is a fragmentary section taken in the direction of arrows 3—3 of FIG. 2.

The elongated jack operating screw 20 is loosely nested within front channel 14, extends axially through thrust bearing 21 resting upon plate 12, through the central aperture of bearing enclosing cup 22, FIG. 3, and up into the inverted cap 23, and is fixedly secured thereto by transverse pin 24.

Elongated handle 25 in "use" position extends laterally of the screw for manual rotation in a horizontal plane, and includes at its free end the reverse curved pin 26 which projects pivotally through cap 23 and is secured thereto at 27, FIG. 2.

*Carrier construction*

Figure 6:
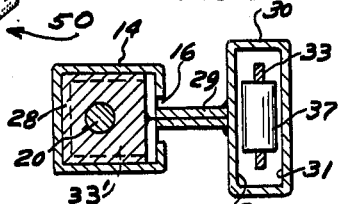
FIG. 6 is a section taken in the direction of arrows 6—6 of FIG. 5.
Figure 5:
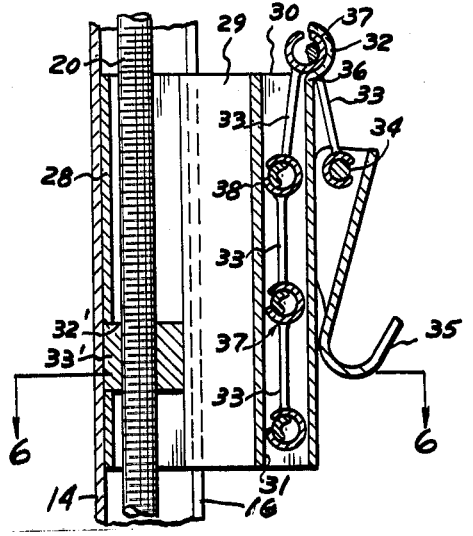
FIG. 5 is a fragmentary section taken in the direction of arrows 5—5 of FIG. 4.

The elongated carrier 28 is of a cross-sectional shape corresponding to the shape of channel 14 and is guidably and movably mounted therein, FIGS. 5 and 6; and includes the laterally extending webbing 29 which projects through slot 16 in the front channel 14 and carries at its outer end the upright elongated tubular body 30. The vehicle engaging hook 35 is adjustably and flexibly supported from said body, which includes the interior front and rear walls 31 for cooperative registry with the flexible support assembly.

Carrier 28, FIG. 5, has a transverse slot at 32' to cooperatively and interlockingly receive nut 33' threaded over screw 20 and which loosely engages the walls of channel 14 for longitudinal movement therein, upon rotary movement of the screw.

Longitudinal movements of nut 33' effects corresponding reciprocal movements of carrier 28 and the connected upright tubular body 30 mounted upon the exterior of the front channel 14 for movements along its length, FIG. 1.

*Bumper engaging hook and flexible mounting*

Figure 4:
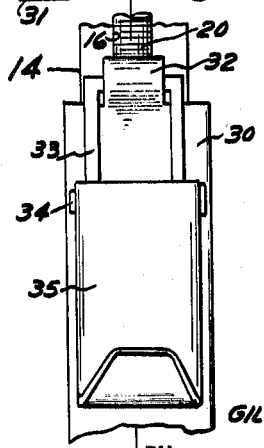
FIG. 4 is a fragmentary front elevational view of the vehicle engaging hook and a portion of its mounting assembly as suspended from the adjustable carrier of the jack.

Bumper engaging hook 35 is flexibly mounted and suspended from tubular body 30 by a flexible connector which may be a link chain 33, FIGS. 4 and 5, chain 43, FIGS. 9 and 10 or cable 47, FIG. 11.

In FIGS. 4 and 5, said connector is a chain consisting of a series of links 33, pivotally interconnected at their ends at 37 and an end link pivotally connected at 34 to hook 35.

Several means are provided for interlocking portions of the flexible connector with tubular body 30. In FIGS. 4 and 5, arcuate retainer lip 32 projects centrally from the front wall of body 30 and cooperatively projects selectively into and through one of the links 33 providing an initial support to the link chain.

The remaining links 33 of the flexible chain, project down into body 30, FIG. 5, cooperatively and frictionally and retainingly engage opposing front and rear walls 31 of said body as at point 38.

Once the flexible connector or link chain 33 has been assembled, FIG. 5, the downward forces of the load from the vehicle bumper engaging hook 35 are directly transmitted, not to lip 32, but axially to the front wall of the body. Thus, lip 32 is merely a temporary holding means and does not absorb the load.

The remainder of flexible chain 33 projects down into tubular body 30. Due to the operative contact of the chain links as at 38 with the interior walls of the body said connector is anchored against displacement and may not be accidentally disconnected from said body. Even if lip 32 should break off, the chain would not be disconnected from said body as long as the load was applied to hook 35.

*Modified connector*

A different form of flexible connector is shown in FIGS. 9 and 10, wherein the opposing side walls 39 of the body at their upper ends are slotted downwardly and forwardly as at 40. These slots are adapted to selectively and cooperatively receive end portions of one of the pins 41 which interconnect links 42 of the flexible link type chain 43 which mounts at 44 the load lifting hook 45.

Intermediate pivot pins 41 may be nested within the opposed slots 40, since in this construction said links extend around the outside of the body 30, FIGS. 9 and 10.

*Modified connector*

Another form of flexible connection between the hook and body is shown in FIG. 11. Continuous cable loop 47 is mounted at its upper end at 46 to extend through the opposed side wall slots 40; and at its lower end pivotally mounts as at 48 the load lifting hook 49.

*Yieldable moving means for front channel*

As shown in FIGS. 1, 7 and 8, a yieldable moving means of one form is pivotally mounted at 53 upon the lower end of front channel 14. Said yieldable moving means, generally indicated at 50, FIG. 7, includes rear wall 51 and the right angularly related parallel opposed side walls 52 which loosely engage around and receive the lower end of channel 14, and is pivotally connected thereto by rivet 53.

Convex laterally elongated rocker support 54 is arranged adjacent and against the lower ends of foot members 51–52 and is fixedly secured thereto as by welding. Its forward elevated portion as at 55, FIG. 8, is inclined angularly upward and rearward forming front plate 56, shown in FIG. 7, fixedly secured to members 52. Thus, the rocker foot receives the lower end of front channel 14 and is pivotally connected thereto at 53.

Relative pivotal movement of rocker foot 50 with respect to channel 14 is limited by engagement of the channel with plate 56 and rear wall 51, FIG. 8.

Resilient means are also interposed between said rocker member and said channel in order to yieldably resist relative pivotal movements. The laterally extending cup 57 is movably positioned through aperture 58 in the rear wall of channel 14 and bears against the upper end of wall 51 as at 59. Coil spring 60 is interposed in compression between cup 57 and pressure pad 61 upon the interior of the front wall of channel 14, which pad spans slot 16 therein. Said resilient means also returns the parts to the relative position shown in FIG. 8 when the load pressure has been relieved from the carrier.

*Operation*

In operation, when a downward load is transmitted through the body to the carrier and to channel 14, such downward pressure will cause a forward rolling or rocking motion of the arcuate support assembly 50, FIG. 8, upon the ground surface G. The said channel does not, as in the past, dig into the ground surface, but moves thereover. Fee 62 have flanges 63 pivotally connected at 64 to legs 17.

Said rear supporting legs 17, instead of elevating above the ground surface, as has often been the case, merely slidably move along the ground surface and remain in contact therewith.

*Modified yieldable moving means*

Another form of yieldable moving means for supporting front channel 14 is shown in FIGS. 12 and 13, and includes first plate 65 which bears against ground surface G. Space thereabove is a second plate 66, fixedly secured to the bottom of channel 14. Roller bearings 67 interposed between the two plates and retained against endwise movement by bottom plate flanges 68.

Upright pins 69 secured to plate 65 adjacent its corners, project upwardly loosely through the elongated slots 70 in top plate 66 terminating in the heads 71. On the application of a downward load upon said channel there will be a relative sliding movement of top plate 66 with respect to bottom plate 65 but limited by the stop assembly which includes pins 69 and slots 70. Coil spring 72 is interposed between channel 14 and a pin 69, FIG. 13, as a yieldable resilient connection between the said channel and bottom plate 65.

*Modified yieldable moving means*

Another form of yieldable moving means for channel 14 is shown in FIGS. 14 and 15. Roller 73 is journaled within the lower end of channel 14 at 74 and projects therebelow for engagement with ground surface G. Laterally extending pin 75 on roller 73 is adapted for cooperative engagement with channel 14 for limiting relative movement. Coil spring 76 is interposed between the channel and said roller for yieldably resisting relative pivotal movement and serving the further function of returning the wheel to its initial position upon removal of pressure therefrom.

*Modification*

Another yieldable mounting means for the front channel is shown in FIG. 16. Foot 77 engages ground surface G and has a transverse angle member 78 secured thereto which serves as a stop to limit pivotal movement of link 79 mounted at 80. The upper end of link 79 is pivotally connected to the lower end of the channel at 81. Coil spring 82 is interposed between said foot and said link to yieldingly resist relative pivotal movements and to return the parts to the position shown when pressure has been removed.

While a tri-pod assembly has been shown in FIG. 1 for illustration, a bi-pod type of jack could be employed which utilizes merely a single upright support leg 17.

Having described my invention, reference should now be had to the following claims:

I claim:
1. In a vehicle bumper jack having a top plate and a collapsible support including an elongated front channel at its upper end secured to said plate, and at least one support leg pivotally connected at its upper end to said plate, the improvement comprising;
    yieldable moving means flexibly and supportably joined to the lower end of said channel providing relative movements therebetween;
    means limiting said relative movements; and
    resilient yieldable means interposed between said channel and moving means normally resisting said relative movements.

2. In the vehicle bumper jack of claim 1, said yieldable moving means consisting of a tubular foot mounted over and pivotally connected to the lower end of said channel for relative pivotal movements;
    and a laterally elongated convex support upon the undersurface of said foot movably engaging the ground surface;
    said resilient means normally resisting relative pivotal movements of the foot, whereby upon downward application of a load upon said channel said convex support will roll forwardly upon the ground surface and the support leg will move forwardly in continued engagement with the ground surface.

3. In the vehicle bumper jack of claim 1, the yieldable moving means consisting of a first plate engageable with the ground surface;
a second plate spaced above and parallel to said first plate and secured upon the bottom of said channel;
bearing means interposed between the plates;
and means between the plates guiding and limiting relative shifting movements between said plates;
said resilient yieldable means being interposed between a plate and said channel.

4. In the vehicle bumper jack of claim 1, the yieldable moving means consisting of a wheel mounted upon and journaled below the lower end of the channel engageable with the ground surface;
and means on the wheel engageable with the channel limting relative movements therebetween; said resilient means interposed between the channel and wheel.

5. In the vehicle bumper jack of claim 1, the yieldable moving means consisting of a foot engageable with the ground surface;
an upright link at one end pivotally mounted upon said foot and at its other end pivotally connected to the lower end of said channel;
and a stop on said foot engageable with said link limiting relative pivotal movements in one direction;
said resilient means including a coil spring interposed between said foot and link.

6. In a vehicle bumper jack having a collapsible support including an elongated front channel, and a vertically adjustable carrier movably and guidably mounted within said channel, the invention comprising;
an upright tubular body upon the exterior of the channel fixedly secured to said carrier for movement therewith along said channel;
a vehicle bumper engaging hook;
and a flexible connector at one end pivotally joined to said hook and towards its other end adjustably connected to and suspended from said body;
a retainer lip upon and projecting centrally above said body;
said connector being a flexible link chain projected down into and engaging said body and intermediate its ends selectively and supportably interlocked with said retainer lip.

7. In a vehicle bumper jack having a collapsible support including an elongated front channel, and a vertically adjustable carrier movably and guidably mounted within said channel, the invention comprising;
an upright tubular body upon the exterior of the channel fixedly secured to said carrier for movement therewith along said channel;
a vehicle bumper engaging hook;
and a flexible connector at one end pivotally joined to said hook and towards its other end adjustably connected to and suspended from said body;
said connector being a flexible link chain projected down into and engaging said body and intermediate its ends selectively and supportably interlocked with said body; said interlock including a retainer lip upon and projecting centrally above said body;
said chain including apertured links to cooperatively receive said lip;
the vehicle load on said hook being transmitted by a link to the wall of said body, the remaining links retainingly engaged by the interior walls of the body.

References Cited by the Examiner

UNITED STATES PATENTS

| | | | |
|---|---|---|---|
| 1,321,950 | 11/1919 | Templeton | 254—133 |
| 1,834,173 | 12/1931 | Paradise | 59—91 |
| 2,600,276 | 6/1952 | Smith | 254—99 |
| 2,616,746 | 11/1952 | Chapman | 254—133 |
| 2,739,787 | 3/1956 | Rice | 254—99 |
| 3,023,999 | 3/1962 | Gebler | 254—99 |
| 3,159,381 | 12/1964 | Graafsma et al. | 254—100 |

WILLIAM FELDMAN, *Primary Examiner.*

MILTON S. MEHR, *Examiner.*